A. O'DONNELL.
LASTING APPARATUS FOR BOOTS AND SHOES.

No. 187,551. Patented Feb. 20, 1877.

Witnesses.
A. Ruppert.
Wm N. Bates.

A. O'Donnell
Inventor.
D. P. Holloway & Co.
Atty.

UNITED STATES PATENT OFFICE.

ANTHONY O'DONNELL, OF ST. CLAIR, PENNSYLVANIA.

IMPROVEMENT IN LASTING APPARATUS FOR BOOTS AND SHOES.

Specification forming part of Letters Patent No. 187,551, dated February 20, 1877; application filed December 18, 1876.

*To all whom it may concern:*

Figure 1:
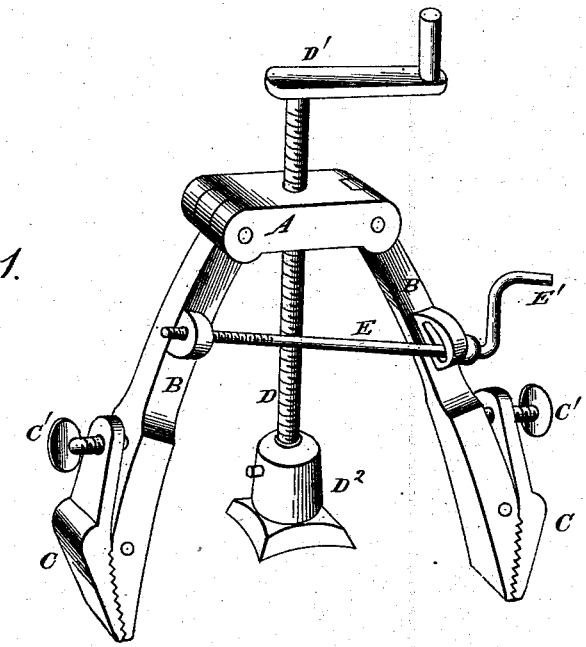
Figure 2:
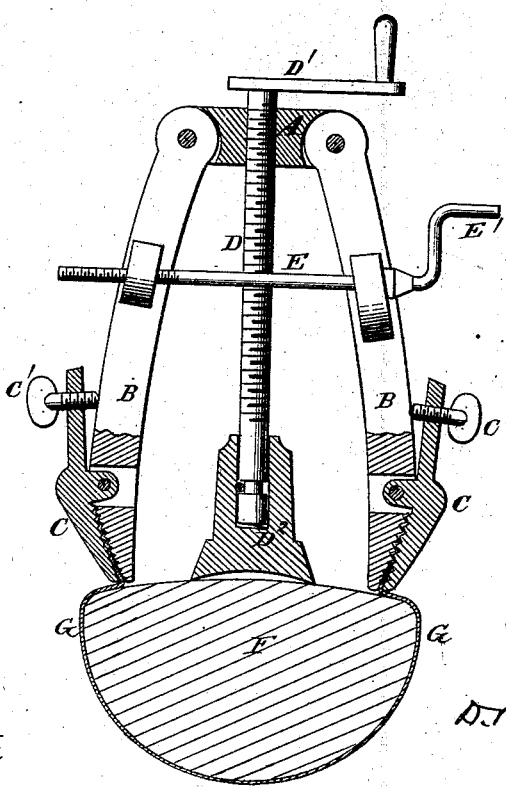

Be it known that I, ANTHONY O'DONNELL, of St. Clair, in the county of Schuylkill and State of Pennsylvania, have invented a new and useful Improvement in Boot and Shoe Laster, of which the following is a specification:

In the annexed drawings, making part of this specification, Figure 1 is a perspective view, and Fig. 2 is a vertical section, of the laster applied to stretching the vamp of a shoe over a last.

The same letters are employed in all the figures in the indication of identical parts.

A is a block, to which two arms, B B, are hinged so as to swing toward or from one another. The lower ends of the arms are beveled and serrated on their outer faces to form one of the clamping-jaws which seize the edge of the vamp to be lasted. The other and corresponding jaws C C are hinged to the arms B B, and are actuated by thumb-screws C', which set them against the vamp G, seizing the edges.

D is a screw passing through a nut in block $D^2$, and actuated by a crank, $D^1$. It revolves in a foot-piece, $D^2$, to which it is attached by a groove and pin, or other ordinary mode, and is intended to bear against the last F, around which the vamp is to be stretched.

E is a rod, with a screw cut on it, one end of which passes through a nut on the arm B, and the other passes through a slot in a lug on the other arm, or in the arm itself. This screw is also actuated by a crank, E'.

In operating with this machine the vamp is placed on the last, and its edges seized by the jaws and held by the action of the thumb-screws C'. The cranks $D^1$ and E' are then turned slowly so as to stretch the vamp, the latter keeping the point of the jaws close to the last, so that, by the combined action of the two, the leather is stretched, and, at the same time, made to conform to the shape of the last.

In the Harrington laster the machine rests on two parallel legs, which serve to support a sliding cross head, through which the elevating-screw passes. By dispensing with these legs I cheapen and simplify the machine, the screw passing directly into a solid block, which serves as a foot-piece, and no guides are required for the cross-heads. By passing the screw E through lugs on the arms above the jaws C, I provide for the independent operation of the latter at any time.

What I claim as my invention, and desire to secure by Letters Patent, is—

The combination, in a boot and shoe laster, of the oscillating arms B B C attached to a cross-head, A, and screw D resting on a foot-piece, $D^2$, which foot-piece is connected with the cross-head only by the screw, which turns in the foot-piece as a base, and acts upon the cross-head and clamps without other guide or support, and a horizontal screw-rod, E, arranged to operate substantially as set forth.

In testimony whereof I have signed my name to this specification in the presence of two subscribing witnesses.

ANTHONY O'DONNELL.

Witnesses:
D. P. HOLLOWAY,
WM. H. BATES.